(12) United States Patent
Helou, Jr.

(10) Patent No.: US 7,261,257 B2
(45) Date of Patent: Aug. 28, 2007

(54) CARGO AIRCRAFT

(76) Inventor: Elie Helou, Jr., 1025 Cindy La., Carpinteria, CA (US) 93013

( * ) Notice: Subject to any disclaimer, the term of this patent is extended or adjusted under 35 U.S.C. 154(b) by 141 days.

(21) Appl. No.: 10/996,799

(22) Filed: Nov. 23, 2004

(65) Prior Publication Data

US 2006/0108477 A1 May 25, 2006

(51) Int. Cl.
*B64C 1/22* (2006.01)
(52) U.S. Cl. .................. 244/137.1; 244/118.1
(58) Field of Classification Search ............. 244/137.1, 244/137.2; 240/4.33
See application file for complete search history.

(56) References Cited

U.S. PATENT DOCUMENTS

| | | | | |
|---|---|---|---|---|
| 2,053,969 | A * | 9/1936 | Olds ........................... | 220/1.5 |
| 2,095,440 | A * | 10/1937 | Hojnowski ............... | 244/118.1 |
| 2,388,380 | A * | 11/1945 | Bathurst ................... | 244/118.2 |
| 2,407,774 | A * | 9/1946 | Fowler ..................... | 244/118.2 |
| 2,425,499 | A * | 8/1947 | Watter ...................... | 244/118.3 |
| 2,425,972 | A * | 8/1947 | Watter ...................... | 244/118.3 |
| 2,876,969 | A * | 3/1959 | Tydon et al. .............. | 244/118.3 |
| 2,931,681 | A * | 4/1960 | Keller ........................ | 254/2 R |
| 3,009,672 | A * | 11/1961 | Tharratt .................... | 244/137.1 |
| 3,028,130 | A * | 4/1962 | Burton ...................... | 244/137.1 |
| 3,055,620 | A * | 9/1962 | Weiland ................... | 244/135 A |
| 3,147,942 | A * | 9/1964 | Griffith ..................... | 244/118.3 |
| 3,150,849 | A * | 9/1964 | Conway et al. .......... | 244/100 R |
| 3,209,929 | A * | 10/1965 | Petersen et al. ............ | 414/676 |
| 3,289,981 | A * | 12/1966 | Meyer ...................... | 244/137.2 |
| 3,368,838 | A * | 2/1968 | Reich ....................... | 294/82.24 |
| 3,381,921 | A * | 5/1968 | McDonough et al. ......... | 410/79 |
| 3,419,164 | A * | 12/1968 | O'Neill ..................... | 414/345 |
| 3,691,595 | A * | 9/1972 | Backteman et al. .......... | 24/287 |
| 3,872,555 | A * | 3/1975 | Link et al. ................. | 24/590.1 |
| 3,966,285 | A * | 6/1976 | Porch et al. .............. | 312/265.4 |
| 3,972,427 | A * | 8/1976 | Stanley et al. ............ | 244/137.1 |
| 4,301,984 | A * | 11/1981 | Olason ..................... | 244/137.1 |
| 4,379,533 | A * | 4/1983 | Caldwell et al. ......... | 244/118.1 |
| 5,238,102 | A * | 8/1993 | Langer ...................... | 206/3 |
| 5,240,207 | A * | 8/1993 | Eiband et al. ............. | 244/190 |
| 5,816,425 | A * | 10/1998 | Keip et al. ................. | 220/4.31 |
| 5,975,464 | A * | 11/1999 | Rutan ....................... | 244/120 |
| 6,494,404 | B1 * | 12/2002 | Meyer ...................... | 244/118.2 |
| 6,817,579 | B2 * | 11/2004 | van der Velden et al. ...................... | 244/137.2 |
| 7,000,765 | B2 * | 2/2006 | Hase et al. ................ | 206/503 |
| 2005/0247824 | A1 * | 11/2005 | Allison, Sr. .............. | 244/137.2 |
| 2006/0022090 | A1 * | 2/2006 | McCoskey et al. ...... | 244/137.1 |
| 2006/0038077 | A1 * | 2/2006 | Olin et al. ................. | 244/137.1 |
| 2006/0108477 | A1 * | 5/2006 | Helou, Jr. ................. | 244/137.1 |

* cited by examiner

*Primary Examiner*—Timothy D. Collins
(74) *Attorney, Agent, or Firm*—Connolly Bove Lodge & Hutz LLP

(57) ABSTRACT

An aircraft for carrying at least one rigid cargo container includes a beam structure with a forward fuselage attached to the forward end of the beam structure and an empennage attached to the rearward end of the beam structure. Wings and engines are mounted relative to the beam structure and a fairing creates a cargo bay able to receive standard sized intermodal cargo containers. Intermodal cargo containers of light construction and rigid structure are positioned within the cargo bay and securely mounted therein. The beam structure is designed to support flight, takeoffs and landings when the aircraft is empty but requires the added strength of the containers securely mounted to the beam structure when the aircraft is loaded. The aircraft is contemplated to be a drone.

22 Claims, 15 Drawing Sheets

CARGO AIRCRAFT

BACKGROUND OF THE INVENTION

The field of the present invention is cargo aircraft for transporting modular containers.

The basic unit for transporting goods has been the truck. Being the basic unit, the truck has defined limitations on intermodal containers that can typically be transported by ships, trains and trucks. Much of commerce today for which intermodal containers are most convenient are high volume, low weight products, computers being one example. Thus, volume instead of weight creates the limiting factor in the design of intermodal containers. As such, containers have grown to the maximum volume capacity of the basic unit, the truck. As such, intermodal containers are limited by the dimensions allowed by highway infrastructures.

The aforementioned intermodal containers have greatly facilitated and lowered the cost of cargo transportation. However, air cargo has generally been excluded from participation in intermodal cargo systems. Aircraft of a size capable of carrying substantial cargo have typically been designed first as passenger aircraft. Cylindrical fuselages and lack of large access ports thereto in such passenger aircraft limit the use of such aircraft for truly intermodal cargo systems. Rather, the aircraft must become the basic unit with odd shaped and smaller sized containers. As a result, even with containerized cargo, a truck must be loaded with multiple individual containers for efficient distribution of air cargo. Such aircraft are also designed to be efficient at high speeds which is costly. Military transports are also not particularly compatible with intermodel cargo systems as they are designed for oversized cargo such as rolling equipment, e.g., tanks and trucks, and palletized, irregularly shaped cargo. Most aircraft specifically designed for the military also are mission directed and overall efficiency for competitive cargo transportation is not a first priority.

The inability of aircraft to participate in intermodal container cargo systems has been disadvantageous to international commerce. Business principals such as just-in-time supply and changing business environments including rapid global internet communication have created a demand for much more rapid international shipping than can be provided by conventional ships. However, air cargo systems remain both expensive and inconvenient to intermodal shipping.

SUMMARY OF THE INVENTION

The present invention is directed to an aircraft having a beam structure to receive at least one rigid cargo container with mounts detachably integrating the at least one rigid cargo container as part of the beam structure to provide structural rigidity to the aircraft in flight.

In a first separate aspect of the present invention, the aircraft includes a forward fuselage and an empennage attached to either end of the beam structure. Wings and engines are also provided.

In a second separate aspect of the present invention, the mounts associated with the beam structure are located on the top side of the beam structure to detachably support at least one rigid container thereon.

In a third separate aspect of the present invention, the mounts are on the underside of the beam structure to detachably suspend at least one rigid cargo container therefrom.

In a fourth separate aspect of the present invention, the at least one rigid cargo container is the size of an intermodal container and is of a composite lightweight structure.

In a fifth separate aspect of the present invention, multiple containers and orientations thereof are contemplated.

In a sixth separate aspect of the present invention, an empennage is constructed to provide direct access longitudinally to the beam from the back of the aircraft.

In a seventh separate aspect of the present invention, a forward fuselage is pivotally associated relative to the beam to allow full access to the forward end of the beam.

In an eighth separate aspect of the present invention, the aircraft is a drone. As a drone, efficient low speed and, correspondingly, longer flights without crew are cost effective and advantageous.

In a ninth separate aspect of the present invention, a forward fuselage, an empennage, wings an engines are each removable as separate units from association with the beam.

In a tenth separate aspect of the present invention, any of the foregoing separate aspects are contemplated to be combined to greater advantage.

Accordingly, it is an object of the present invention to provide an improved cargo aircraft. Other and further objects and advantages will appear hereinafter.

DETAILED DESCRIPTION OF THE PREFERRED EMBODIMENTS

Figure 1:
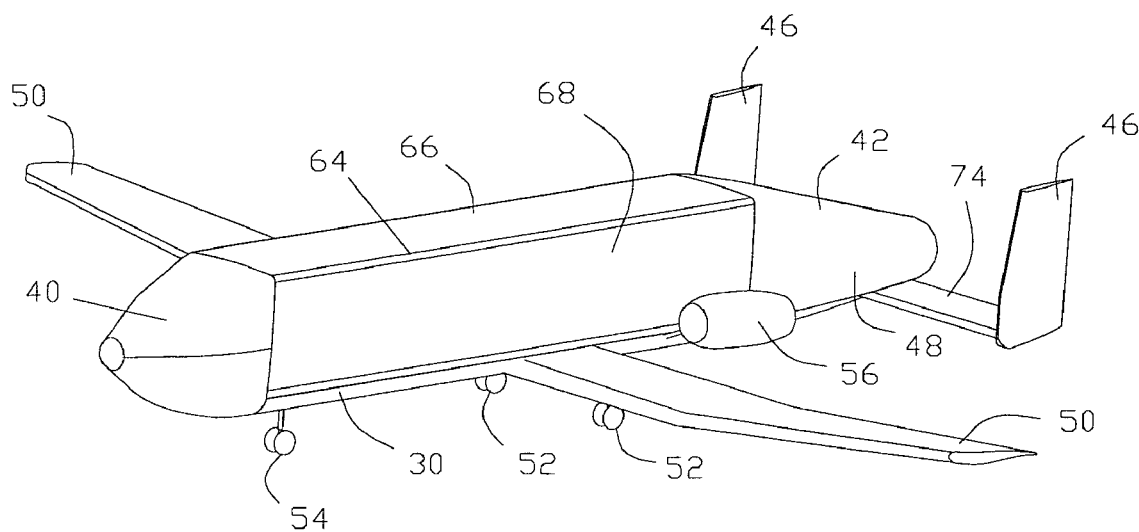
FIG. 1 is a perspective view of a first embodiment of an aircraft.
Figure 2:
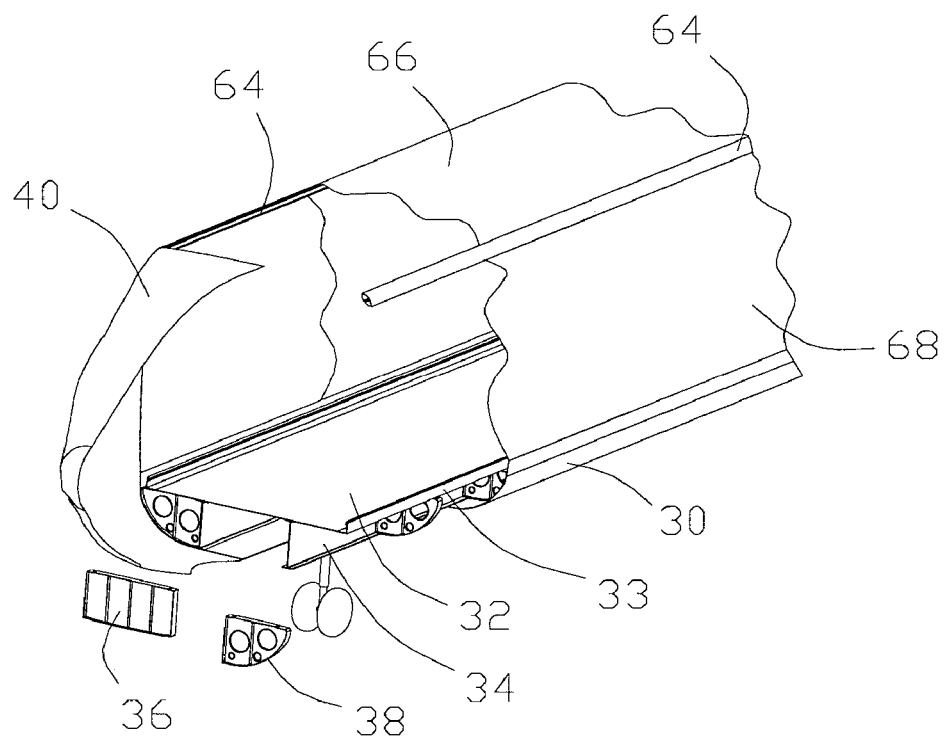
FIG. 2 is a partial perspective view with portions broken away for clarity of the aircraft of FIG. 1.
Figure 3:
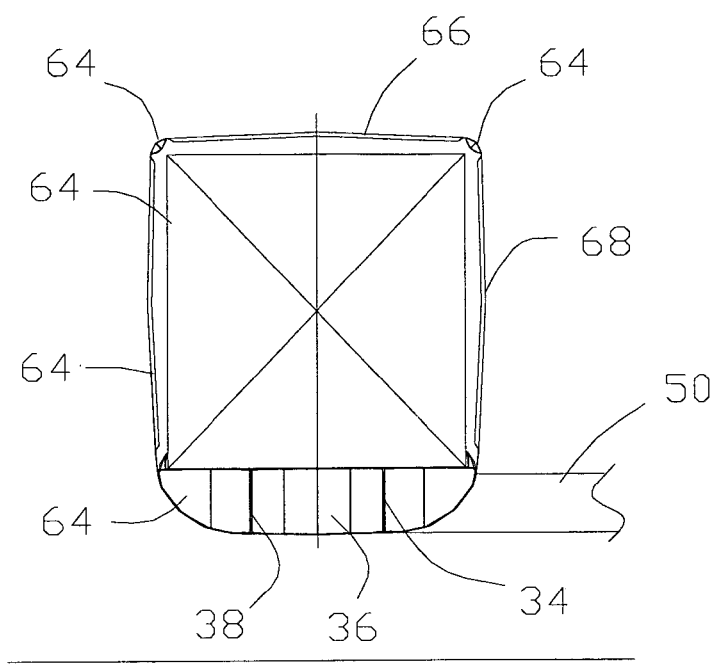
FIG. 3 is a cross-sectional view taken transversely through the fuselage of the aircraft of FIG. 1.

FIG. 1 illustrates a first aircraft design with an integrating and supporting beam structure 30 having two ends. The details of the beam structure 30 are better illustrated in FIGS. 2 and 3. The beam structure 30 includes a floor 32 which may include rollers and/or antifriction devices to facilitate longitudinal movement of a cargo container along the surface of the floor 32. Restraining flanges 33 run along each longitudinal side of the floor 32. In addition to the floor 32, the beam structure 30 includes I-beams 34 with bulkheads 36, 38 positioned periodically along the beam structure 30 and affixed to the floor 32 and the I-beams 34. The beam structure 30 becomes a rigid structure which is preferably sufficient to support the aircraft in flight when empty but cannot support the aircraft in flight when loaded.

A forward fuselage 40 is located at one end of the beam structure 30. The forward fuselage 40 is shown to be that of a drone with no cockpit. Since the Shuttle SRTM mapping mission, it has been possible to have extended commercial flights without human intervention. A cargo drone can fly at low speeds for long distances without concern for crew time and passenger fatigue. The aircraft can therefore be designed for highly efficient flight profiles without accommodation for crew and passengers.

Figure 9:
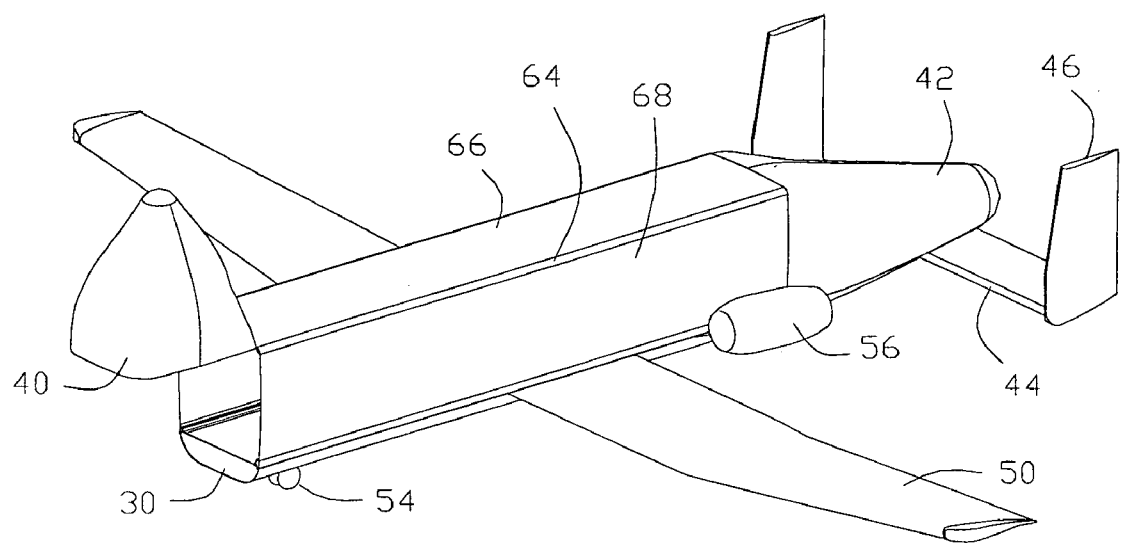
FIG. 9 is a perspective view of the aircraft of FIG. 1 with the forward fuselage raised.

As illustrated in FIG. 9, the forward fuselage 40 is pivotally mounted relative to the beam structure 30 to fully expose the interior cavity above the beam structure 30 from the forward end of the aircraft for loading of cargo containers. The guidance and control for the aircraft may be located in the forward fuselage 40; but, given the lack of a cockpit, can be located elsewhere with equal facility. The forward fuselage 40 may be removed from association with the beam as a unit.

Figure 8:
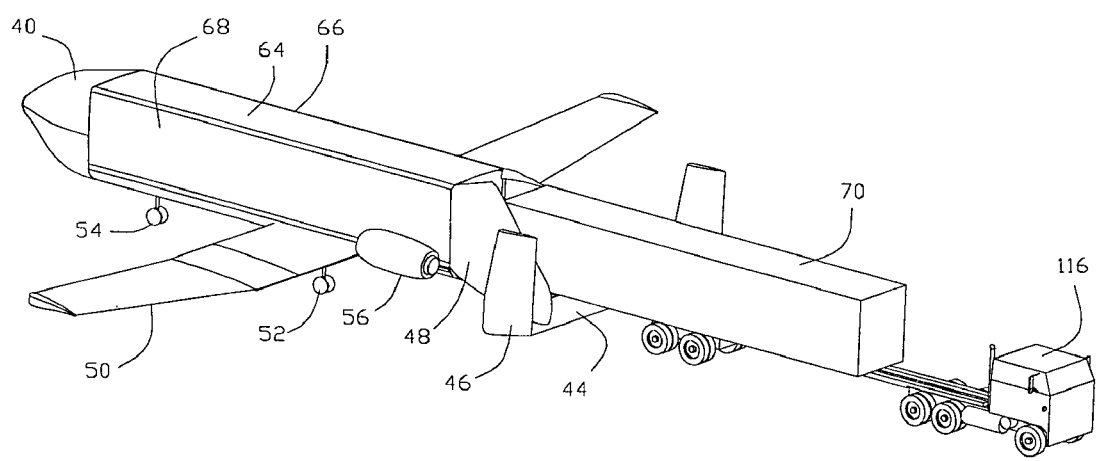
FIG. 8 is a perspective view of the aircraft of FIG. 1 being loaded or unloaded.

An empennage 42 is attached to the other end of the beam structure 30. The empennage 42 includes laterally extending horizontal stabilizers 44 with twin vertical stabilizers 46 positioned at the outer ends of the horizontal stabilizers 44. As illustrated in FIG. 8, the rear fuselage 48 forming part of the empennage 42 may be split vertically and pivotally mounted to either side of the main fuselage. In this way, access is provided to the rear end of the beam structure 30 across the ramp defined by the empennage 42 including the horizontal stabilizers 44. The empennage 42 may be removed from association with the beam as a unit.

Wings 50 are also structurally associated with the beam structure 30. The wings 50 as well as the beam structure 30 may contain fuel tanks. Landing gear 52 are provided under the wings 50; and a forward gear 54 is provided under the beam structure 30. The wings 50 may be removed from association with the beam as a unit.

Figure 28:
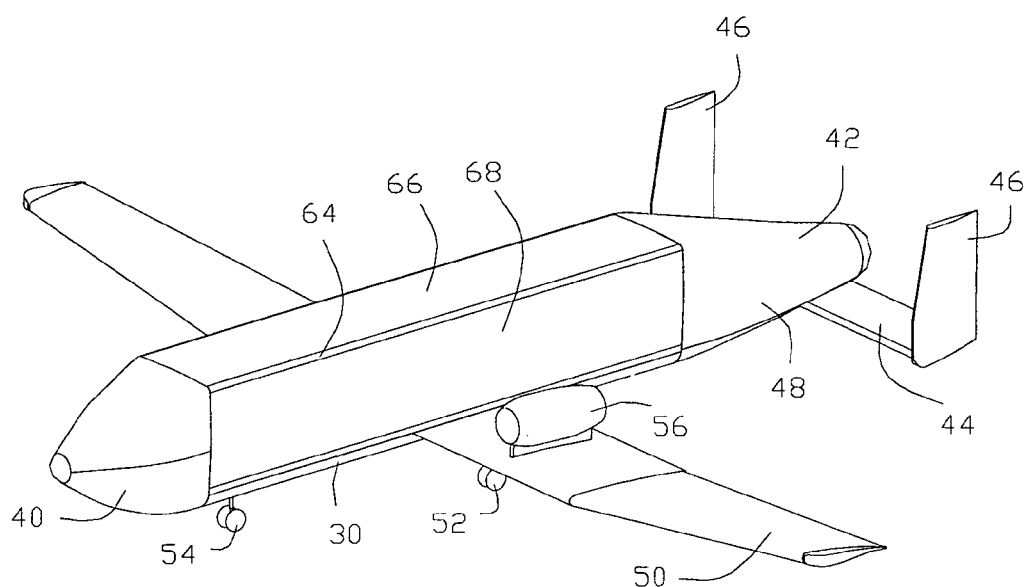
FIG. 28 is a perspective view of an aircraft of a further embodiment.

Engines 56 are shown in the embodiment of FIG. 1 to be directly mounted to the beam structure 30. An engine on each side, symmetrically mounted, is contemplated. Alternatively, as illustrated in FIG. 28, the engines 56 are mounted atop the wings 50. This arrangement is understood to add to the efficiency of the aircraft. The engines 56 may each be removed from association with the beam as a unit.

Figure 6:
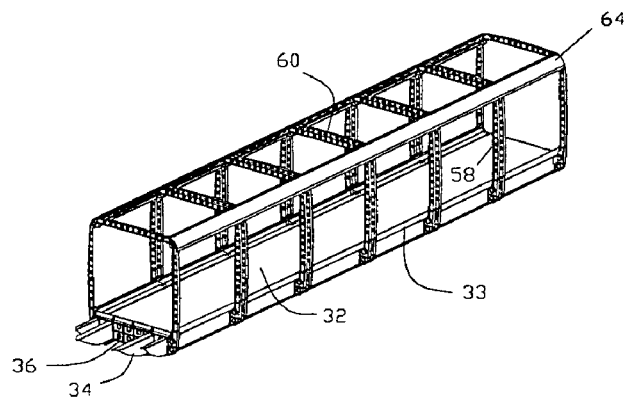
FIG. 6 is a detailed perspective of the fuselage of the aircraft of FIG. 5.
Figure 5:
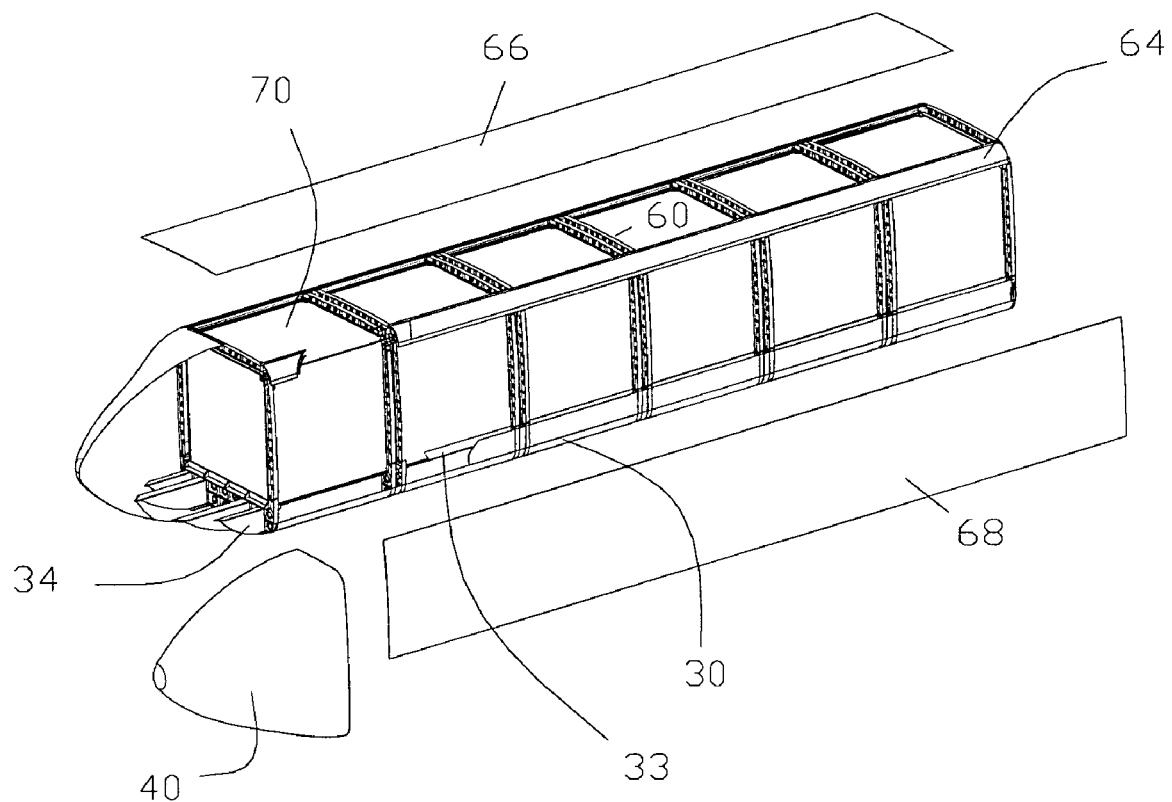
FIG. 5 is a partial exploded perspective view of the aircraft of FIG. 1.
Figure 7:
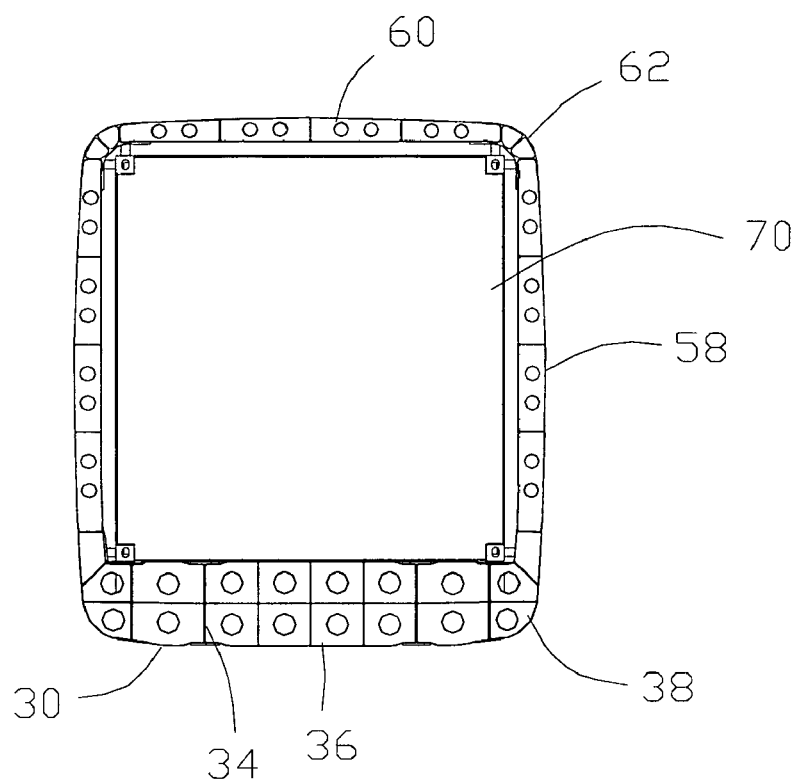
FIG. 7 is a side view of a fairing frame for the aircraft of FIG. 1 with a container in place.

FIGS. 5 and 6 illustrate framing to support aerodynamic panels. The frame includes vertical elements 58 and horizontal elements 60 with corner elements 62 lying in transverse planes of the aircraft. One such frame 63 is illustrated in greater detail in FIGS. 7, 29 and 30. These elements 58, 60 are typically of I-beam cross section with lightening holes as in conventional aircraft construction. Corner elements 64 extend longitudinally at the intersections of the vertical elements 58 and horizontal elements 60. These corner elements 64 may provide structural rigidity to augment the strength of the beam structure 30 and certainly provide sufficient rigidity to retain fairing components in place on the frame 62. In FIG. 5, a top fairing panel 66 and a side fairing panel 68 are shown. Of course, a second side fairing panel 68 is also deployed on the other side of the aircraft.

The aircraft thus defined provides a cargo bay which is designed and sized to closely receive rigid cargo containers 70 forming right parallelepipeds which are the sizes of intermodal containers. Such intermodal containers are typically of a given height and width and varying incrementally in length. An alternative to the construction of a fairing to define a cargo bay between the forward fuselage 40 and the empennage 42 would be to define the intermodal containers with aerodynamic surfaces. The forward fuselage 40 and the empennage 42 would transition to create an aerodynamic surface with the forward fuselage 40 and the empennage 42. The containers 70 would be designed to be compatible with truck transportation whether or not they have aerodynamic surfaces.

In the embodiments, the rigid cargo containers 70 provide strength to the beam structure 30. The beam structure 30 is designed to be as light as possible. As such, the beam structure 30 is capable of supporting takeoff loads, flight loads and landing loads of the aircraft when free of cargo. Additionally, the beam structure 30 must be sufficient to support compression loads upon landing even when fully loaded. However, the beam structure 30 is not required to fully sustain bending and torsional loads in flight, landing and takeoff when a rigid cargo container or multiple such containers are in place in the aircraft. The additional rigidity required is supplied by the rigid cargo containers 70. To this end, the containers 70 are constructed with sufficient structure and rigidity and are securely mounted to the beam structure 30 such that bending and torsional forces experienced by the beam structure 30 are imposed upon the securely mounted container or containers 70.

Figure 15:
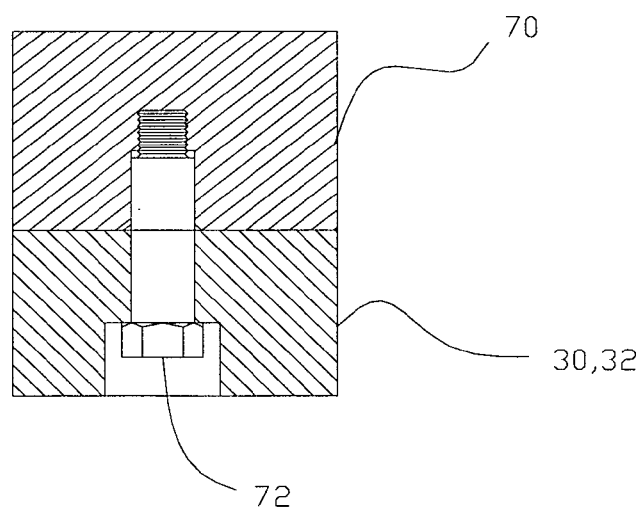
FIG. 15 is a cross-sectional view of a mount between the beam structure and a container.

Mounts 72 are provided on the beam structure 30. These mounts may be bolted or otherwise retained on the floor 32. Further, incremental adjustments are preferably provided in order that the mounts 72 can attach to the container or containers 70 while accommodating variations in container length and placement. Such incremental adjustment may be provided by patterns of attachment holes in the floor 32 to allow for lateral or longitudinal repositioning of the mounts 72 once the container or containers 72 are in place. A mount 72 is illustrated in FIG. 15 as a shoulder bolt 72 which extends between the beam structure 30 and a container 70. Such a bolt 72 provides substantial shear resistance as well as tension loading. The mounts 72 may be located or positionable along the full length of the floor 32 or at incremental positions reflecting standard container sizes. The mounts may face inwardly from the sides of the floor 32. Access ports through the fairings may be provided to allow access to the mounts 72. Alternatively, mechanisms may be employed which are automatic or remotely actuated.

Figure 16:
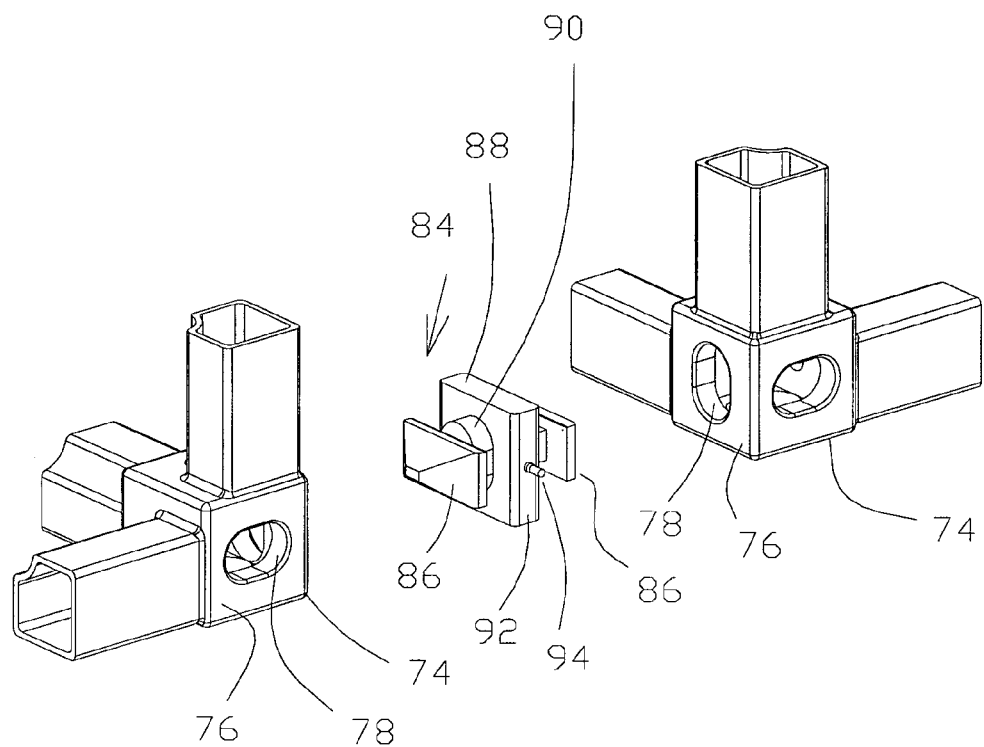
FIG. 16 is an exploded perspective view of corner attachments and couplers.

Attachments 74 are illustrated in FIG. 16 as formed boxes 76 through which slots 78 extend. By employing the formed boxes 76, the slots 78 terminate to provide an inner face. The attachments 74 are located in the structure of the rigid container or containers 70. As such, the attachments 74 cooperate with the formed boxes 74 with slots 76 through the walls thereof. The formed boxes 76 may include thick walls on one outer side or bottom to receive the mounts 72.

To fix the attachments 74 to one another, couplers 84 are employed. Each coupler 84 includes two heads 86 extending in opposite directions from a coupler body 88. The heads 86 are undercut between the body 88 and each of the heads 86 to form opposed engaging surfaces on the inner sides of the heads 86. The heads 86 also fit within the slots 76 in one orientation. The heads 86 have a convex surface for easier placement in the associated slots 76.

The couplers 84 may be formed such that the heads 86 are on a shaft rotatable within the body 88. A collar 90 is separated from each of the heads 86 by substantially the thickness of the walls of the formed boxes 76 with the collar 90 being of sufficient diameter that the collar 90 cannot fit within the slots 78. The collar 90 also provides access once the heads 86 are positioned in the slots 78 for rotation of the heads 86 into a locked orientation with the slots 78. The body 88 is of sufficient size and includes flat sides 92 such that it is prevented from rotating by the floor 32. Once the head 86 have been properly located, a set screw 94 can be placed to insure that the heads 86 will not rotate relative to the attachments 74. The same mechanisms are employed between attachments 74 on adjacent containers 70.

The mounts 72 may correspond to the attachments 74 and employ the same mechanisms as shown in FIG. 16. Identical slots 78 in the floor 32 or the restraining flanges 33 can cooperate with the slots 78 in the containers 70 and couplers 84 to restrain the containers 70 and integrate the structures thereof with the beam structure 30.

Figure 10:
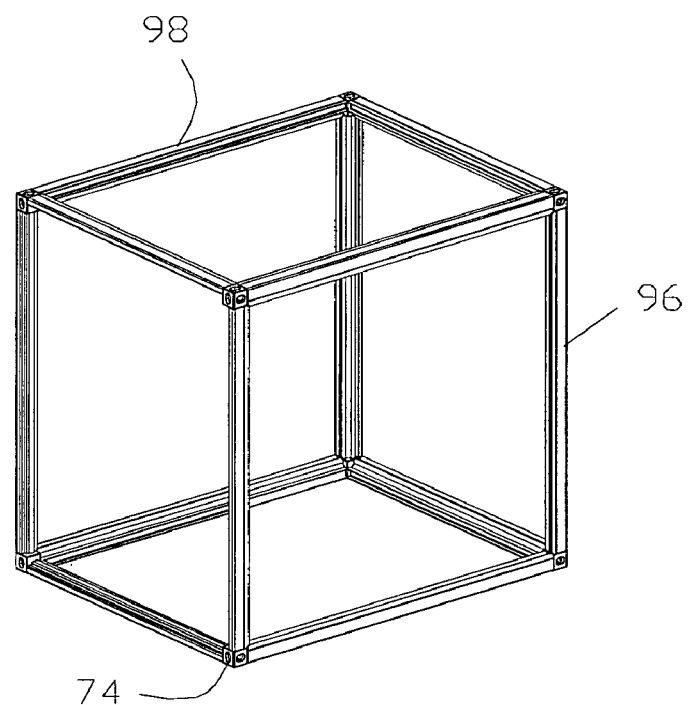
FIG. 10 is a perspective view of a frame structure of a cargo container.
Figure 11:
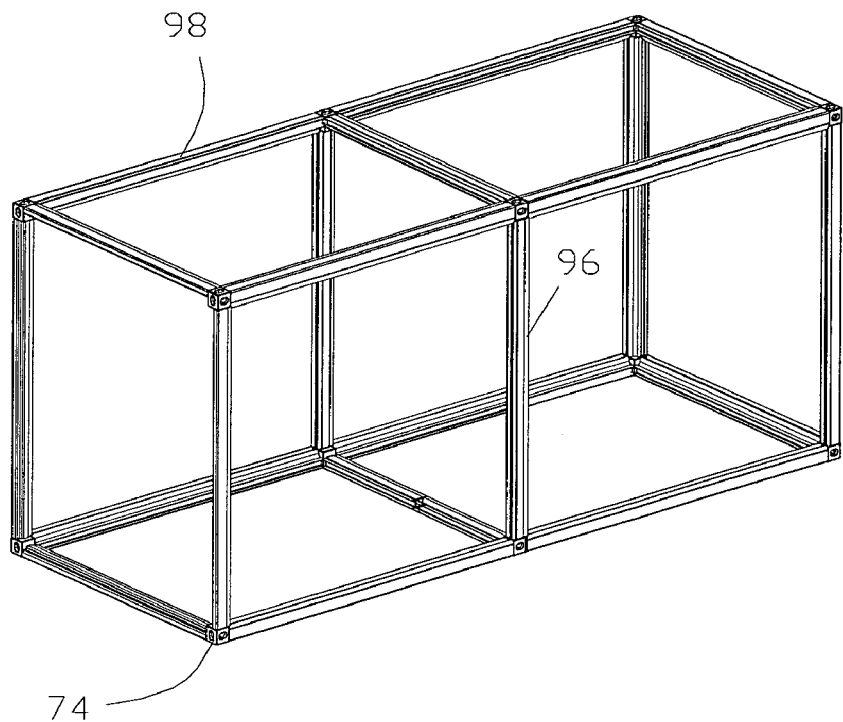
FIG. 11 is a perspective view of a longer frame structure of a cargo container.
Figure 13:
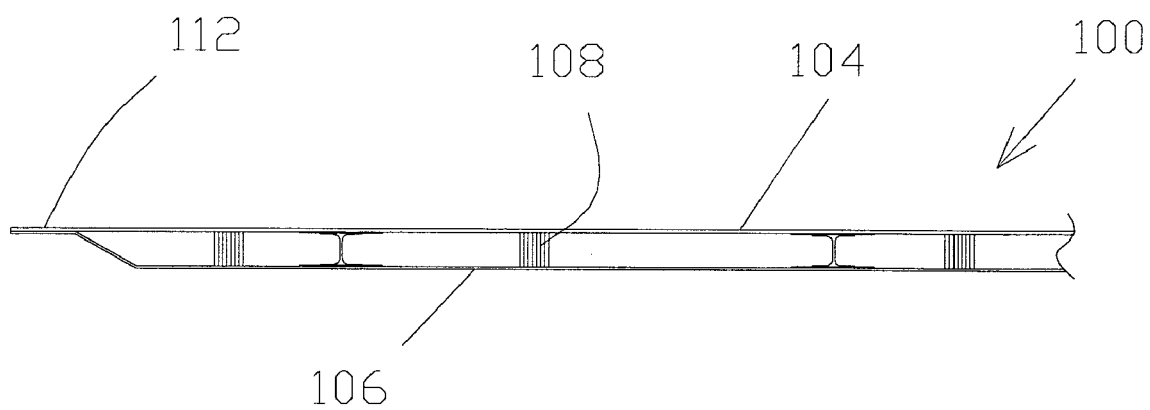
FIG. 13 is a partial cross-sectional view of a panel illustrated in FIG. 12.
Figure 12:
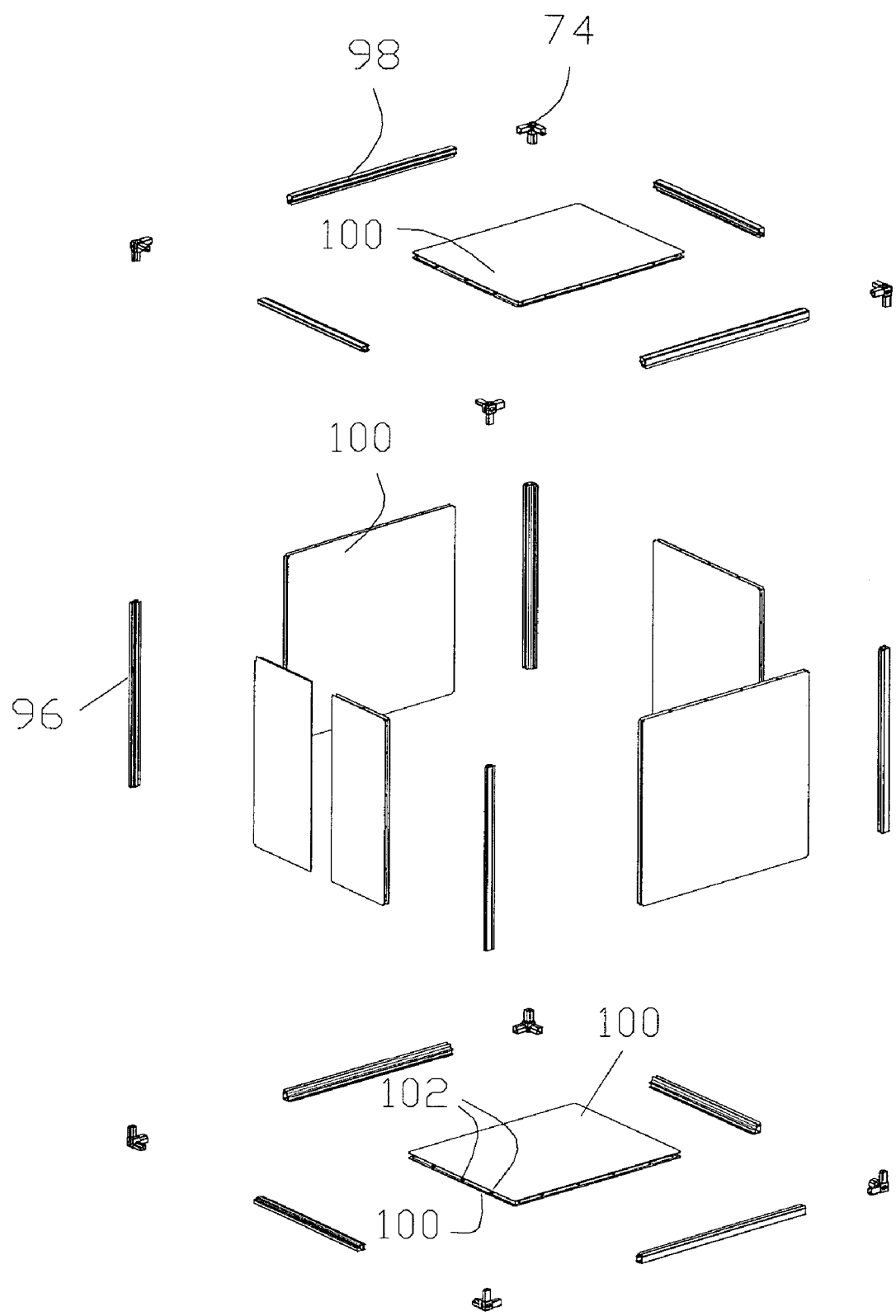
FIG. 12 is a perspective view of an exploded assembly of a cargo container.
Figure 14:
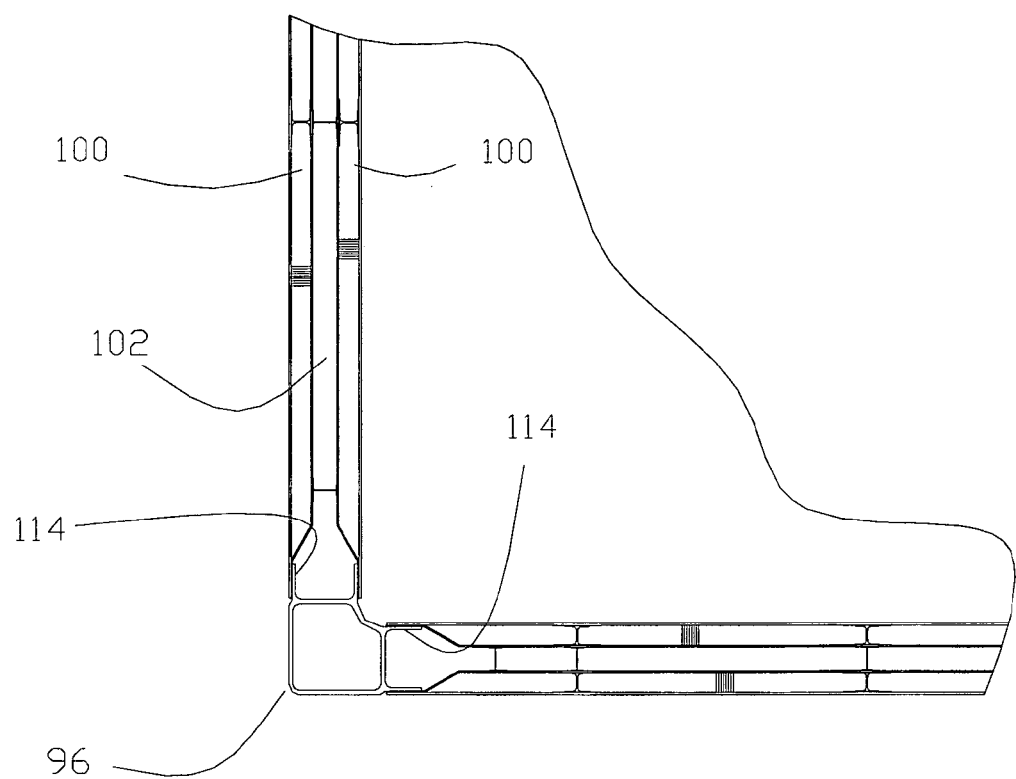
FIG. 14 is a detail cross-sectional view of an assembled panel on a cargo container.

Each rigid cargo container 70 is constructed as shown in FIGS. 10 through 16. A first internal structure of a container is illustrated in FIG. 10. This structure includes four columns 96 and eight beams 98 fixed together by corner attachments 74 as illustrated in FIG. 10 to form a right parallelepiped. Panels 100 are then assembled with longerons 102 to form a top, a bottom and sides of the cargo container 70. A representative panel 100 is illustrated in FIG. 13. The panel 100 is formed of lightweight material. In this embodiment the panel 100 is defined by two thin sheets 104, 106 separated by honeycomb 108. Inner longerons 110 are also placed between the sheets 104, 106 and attached thereto. About the periphery of each of the panels 100, the sheets 104, 106 come together to form an attachment flange 112. Each of these panels 100 may be of composite material or a mixture of aluminum sheets 104, 106 and formed honeycomb 108.

Figure 4:
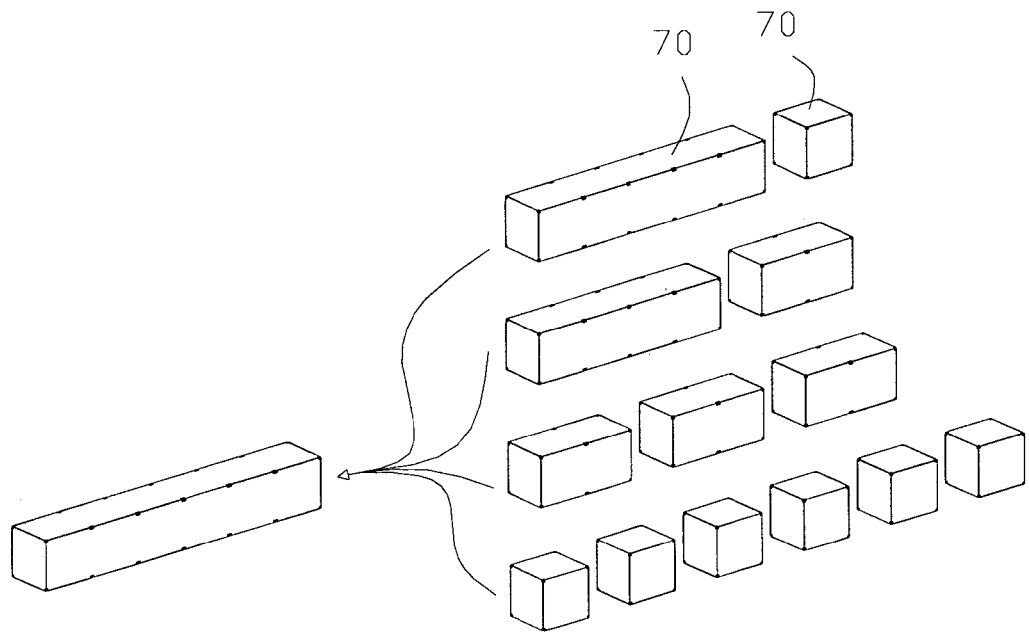
FIG. 4 is a perspective view of a cargo bay and combinations of containers.

FIG. 13 illustrates the sides, top and bottom of the completed cargo container 70 in association with the structure defined by the four columns 96 and eight beams 98. Two panels 100 are associated together with longerons 102 positioned therebetween. The attachment flanges 112 are fixed to the corner columns 96 and beams 98 which include parallel flanges 114 for that purpose.

Where longer containers are contemplated, intermediary columns 96 and beams 98 may additionally be employed. In this way, all panels 100 may be of the same size through appropriate location of the columns 96 with the overall lengths of the containers being multiples of the container illustrated in FIG. 10. Multiple containers of varying length may be employed to create an overall payload for an aircraft of a given length. FIG. 4 illustrates such arrangements with a sixty-foot long cargo area and containers 70 broken into various multiples of ten-foot lengths.

FIG. 8 illustrates employment of the first embodiment through the placement of a cargo container 70. A truck 116 is shown aligned with the cargo area of the aircraft. In this case, the rear fuselage 48 is defined by doors which extend in an aerodynamic form and can also open to fully expose the interior of the fairing for insertion or removal of the rigid cargo container 70. This container 70 may be, as illustrated in FIG. 4, one single container or a preassembled group of containers 70. Winches and other mechanisms may be employed to assist in the repositioning of the container or containers 70 either in the aircraft or on the truck 116. Alternatively, the forward fuselage 40 may be pivoted out of the way as illustrated in FIG. 9 and the container 70 loaded from or unloaded to the truck 116 from the front of the aircraft. The landing gear 52 and/or forward gear 54 may be additionally exendable or retractable or the mounts thereof my be able to move up and down to accommodate the level of the bed of a truck 116.

Figure 17:
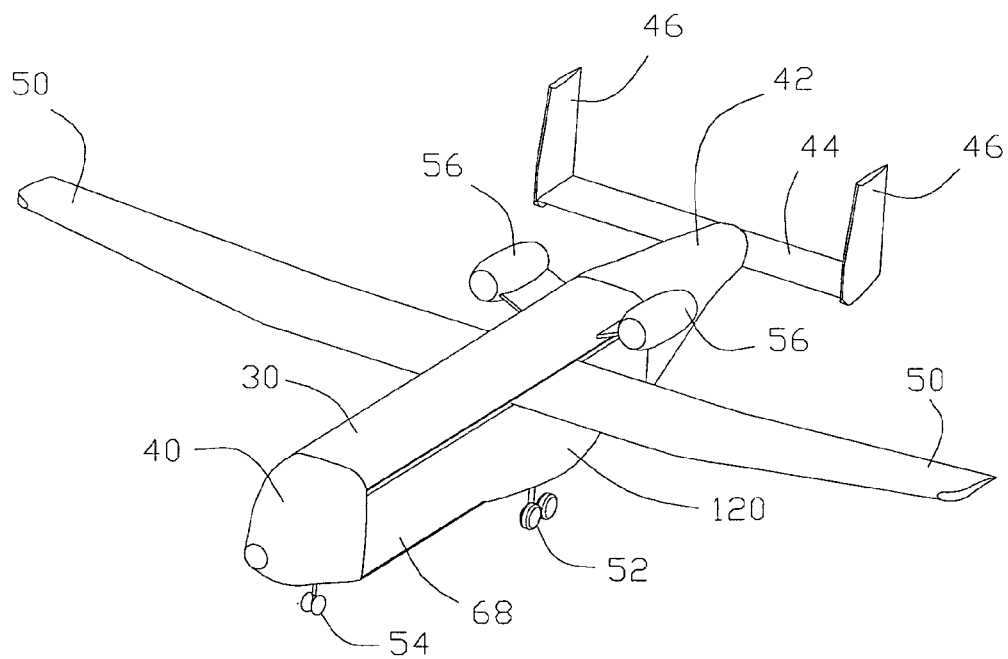
FIG. 17 is a perspective view of a second embodiment of an aircraft.
Figure 18:
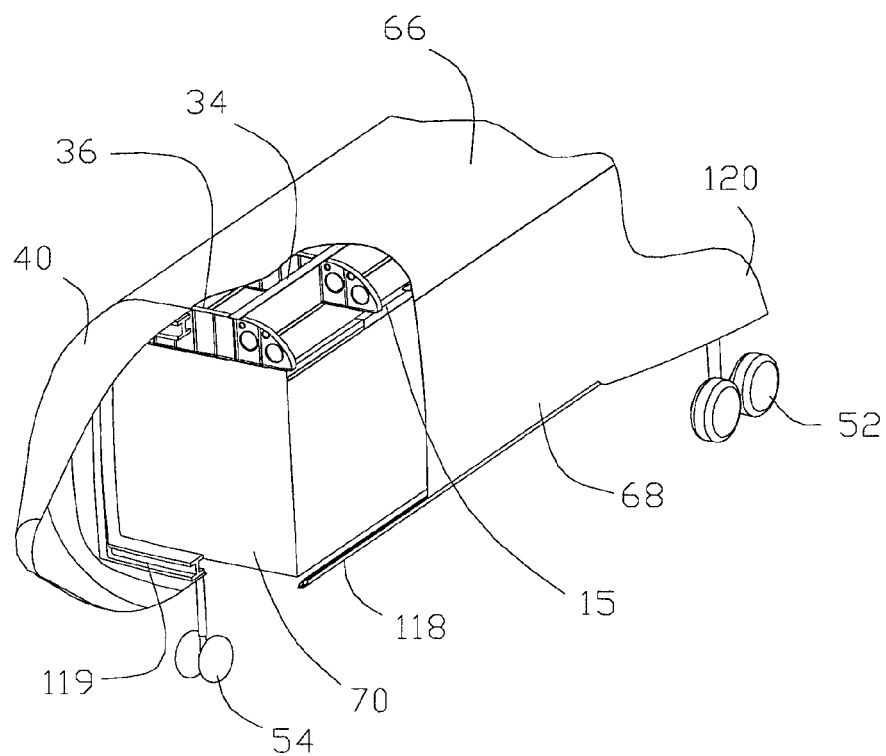
FIG. 18 is a partial perspective view of the aircraft of FIG. 17 with portions broken away for clarity.
Figure 19:
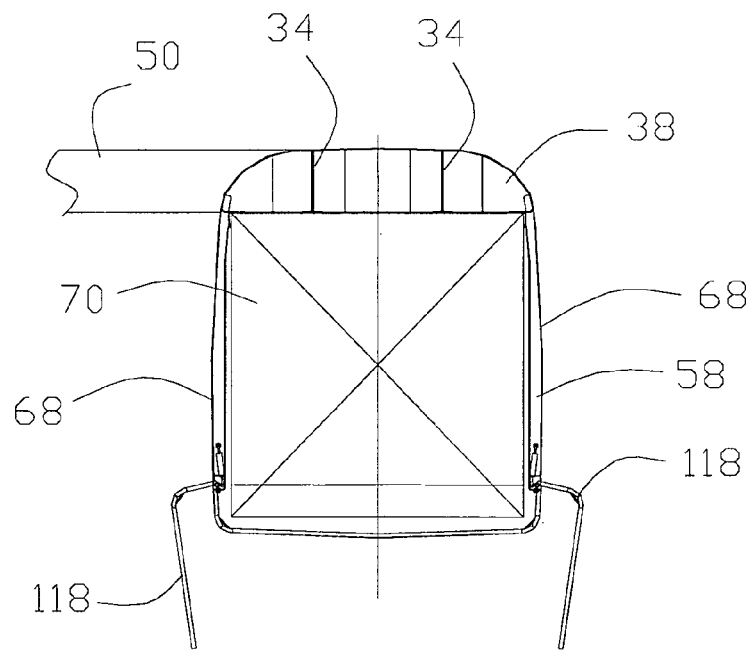
FIG. 19 is a cross-sectional view taken transversely of the fuselage of the aircraft of FIG. 17.
Figure 20:
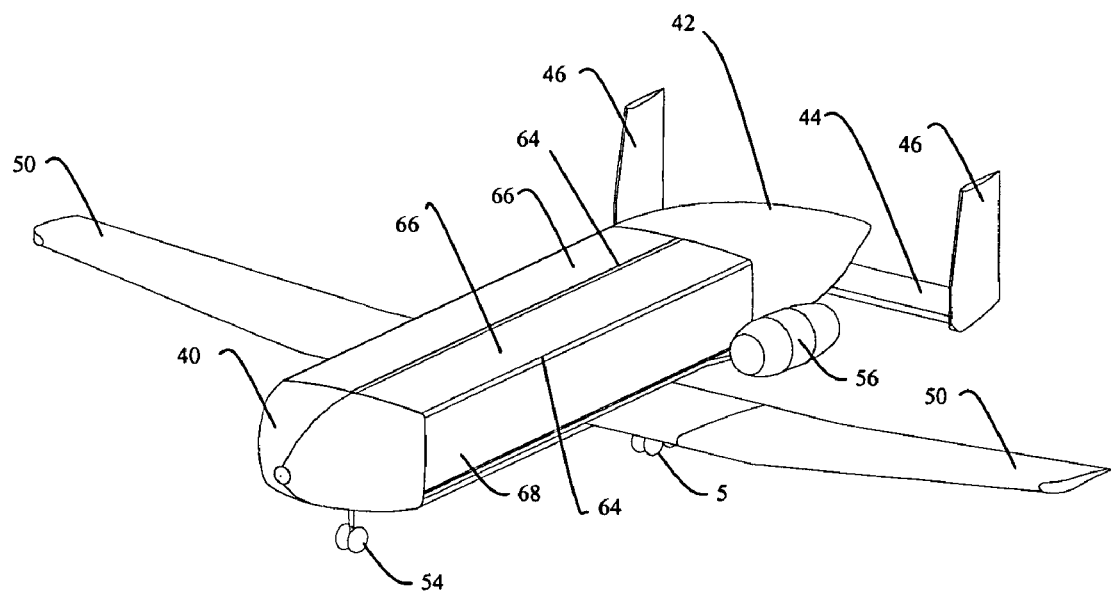
FIG. 20 is a perspective view of an aircraft with cargo containers side by side.

The general principles described herein with regard to the first embodiment also apply to the several other embodiments which are presented. A second embodiment is illustrated in FIGS. 17 through 19. In this embodiment, the beam structure 30 is arranged at the top of the aircraft with the rigid cargo container or containers 70 suspended thereunder through attachments to the underside of the beam structure 30. In this second embodiment, the beam structure is effectively inverted and is formed of a very similar structure to that of the first embodiment. The wings 50 are correspondingly associated with the top of the aircraft to be at the beam structure for support. Further, the engines 56 are also so located.

This repositioning of the beam structure 30 makes the loading and unloading of containers through the empennage 42 more difficult. However, the forward fuselage 40 continues to provide loading capability through rotation of the forward fuselage 40 out of the way. Alternatively, cargo bay doors 118, as illustrated in FIG. 19, may provide access for loading of the container or containers 70 from below. To accommodate this overhead placement of the beam structure 30, the landing gear 52 must be supported at a greater distance than as required in the first embodiment. Either the gear 52, 54 itself or structure 119 may extend within additional fairings 120 to either side of the fuselage.

Figure 21:
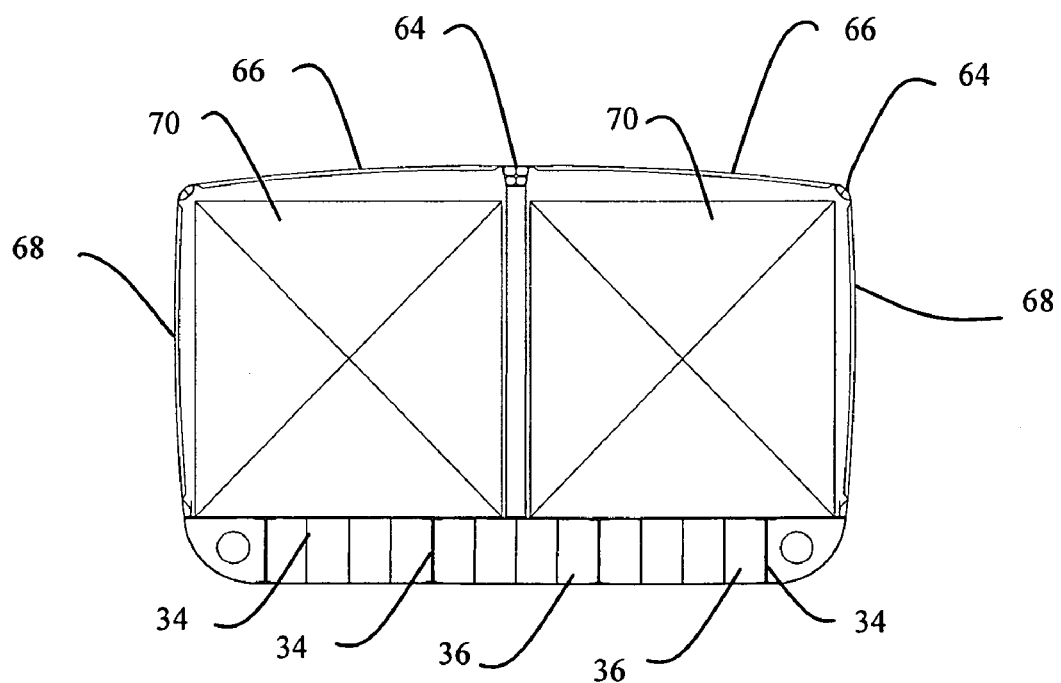
FIG. 21 is a cross-sectional view of the fuselage of the aircraft of FIG. 20.
Figure 22:
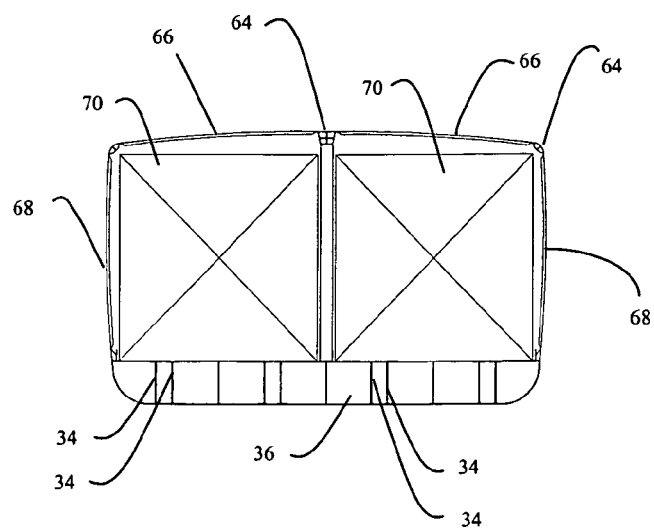
FIG. 22 is a cross-sectional view as in FIG. 21 with an amended beam configuration.
Figure 23:
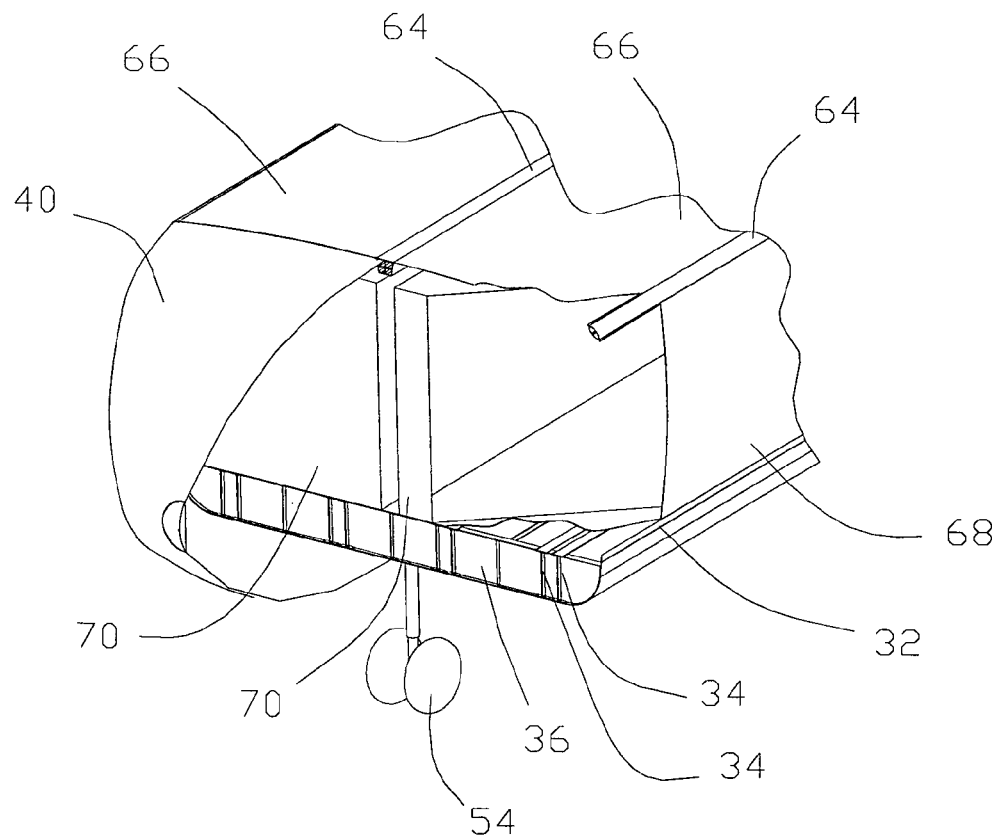
FIG. 23 is a partial perspective view of the aircraft of FIG. 20 with portions broken away for clarity.

FIGS. 20 through 23 illustrate another configuration having a double-wide beam structure 30 to accommodate side-by-side rigid cargo containers 70. But for the dimensional changes and required additional structural rigidity within the beam structure 30, the foregoing discussion applies to this embodiment. FIGS. 21 and 22 show two different configurations of the I-beams 34 to support different expected weight requirements. These figures also illustrate a central column disposed between the side by side containers which can be a bulkhead or a series of independent columns. Alternatively, the side by side containers 70 can be linked together as discussed above and the containers 70 at or adjacent that joint also attached to mounts associated with the central corner element 64 with no central column present.

Figure 24:
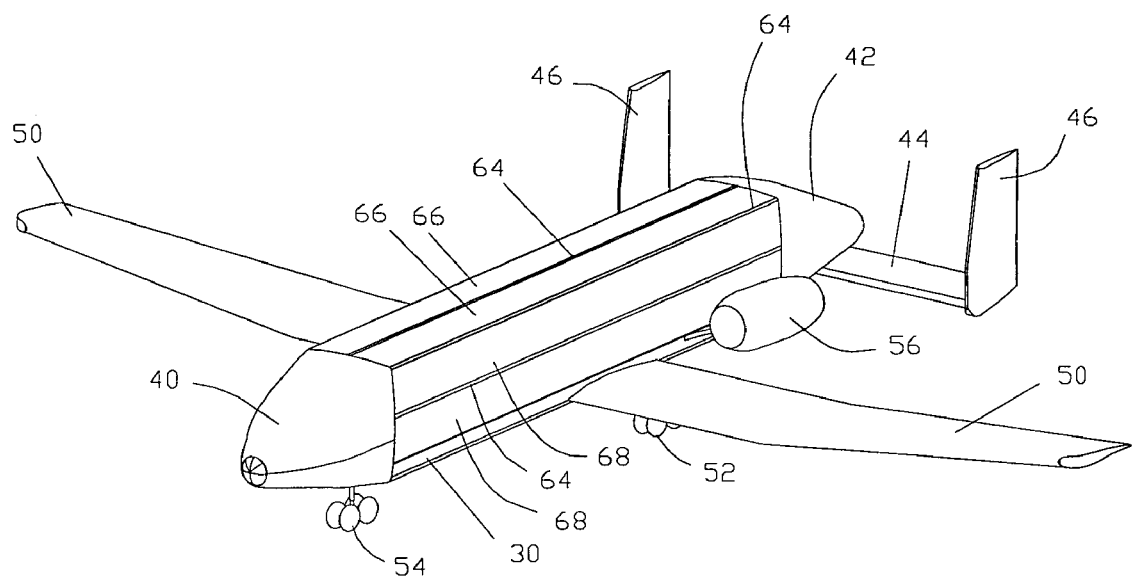
FIG. 24 is a perspective view of a fourth embodiment of an aircraft.
Figure 25:
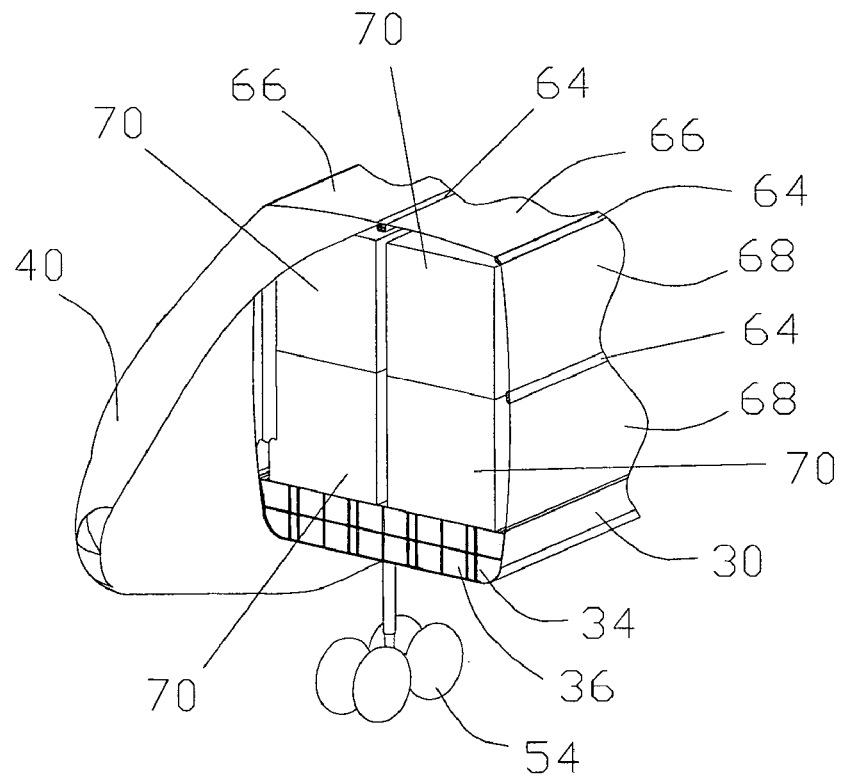
FIG. 25 is a partial perspective view of the aircraft of FIG. 24 with portions broken away for clarity.
Figure 26:
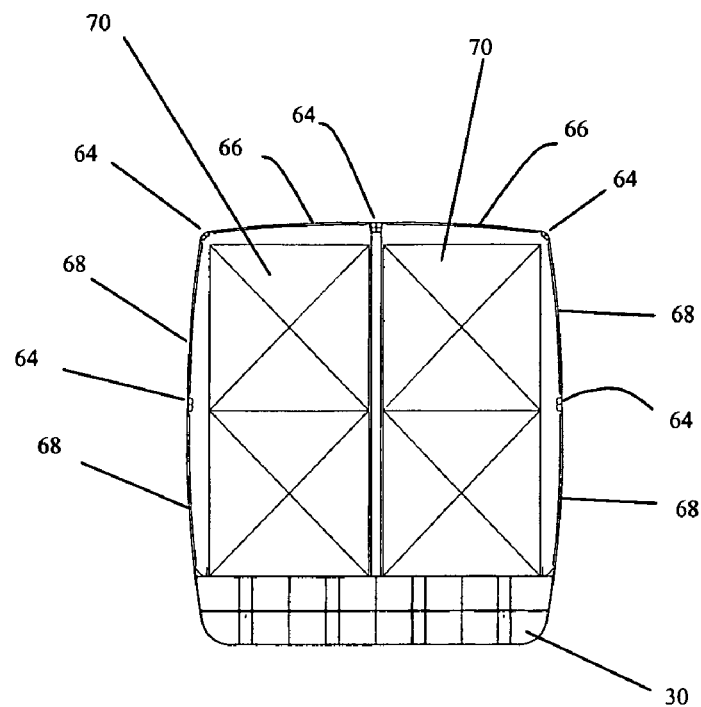
FIG. 26 is a cross-sectional view of the fuselage of the aircraft of FIG. 24.

FIGS. 24 through 26 illustrate yet another embodiment designed to accommodate a different arrangement of rigid cargo containers 70. In this embodiment, two-high sets of containers are placed side by side to achieve four times the cross-sectional area for container cargo as in the first embodiment. The same comments applied to FIGS. 21 and 22 regarding the central column, illustrated between the containers 70 in FIG. 26, apply to this embodiment.

Figure 27:
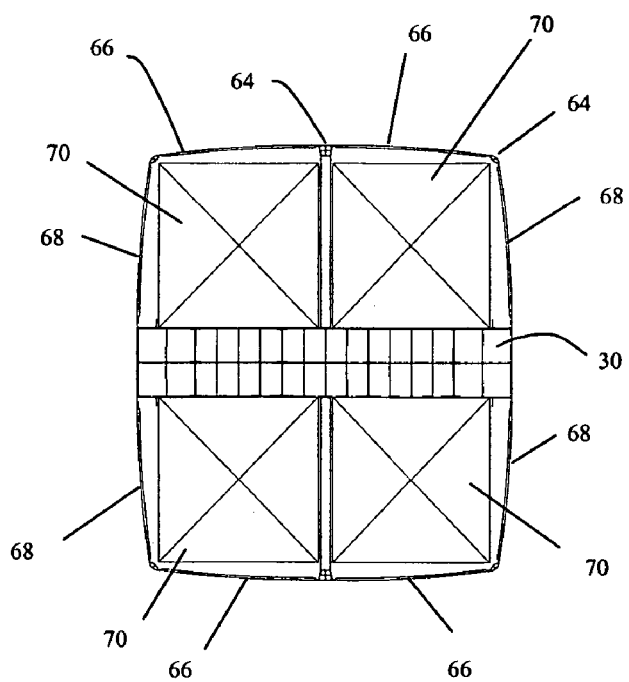
FIG. 27 is a cross-sectional view of the fuselage of yet another embodiment.

FIG. 27 provides a hybrid between the first and second embodiments. Two sets of side-by-side cargo containers 70 are positioned above and below the beam structure 30. The same comments applied to FIGS. 21 and 22 regarding the central column, illustrated between the containers 70 in FIG. 27, apply to this embodiment.

Figure 29:
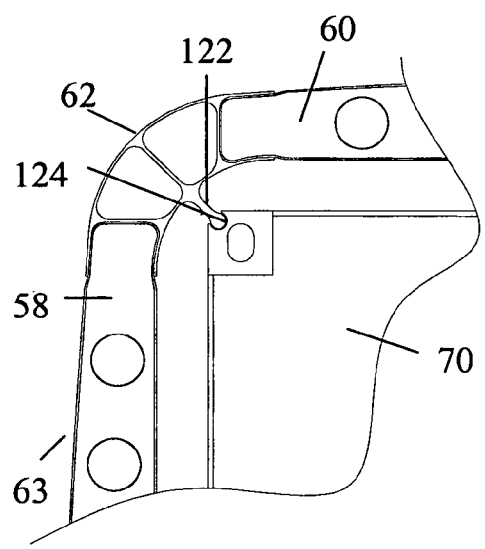
FIG. 29 is a partial side view of the fairing frame of FIG. 7 with a first attachment rail system.
Figure 30:
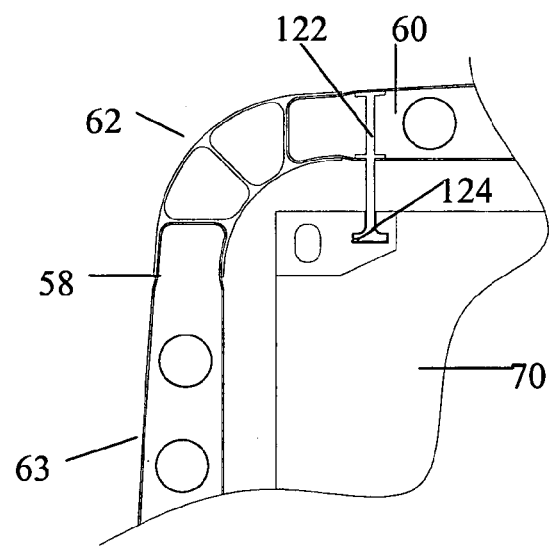
FIG. 30 is a partial side view of the fairing frame of FIG. 7 with a second attachment rail system.

FIGS. 29 and 30 illustrate yet another feature which can augment the structure of the system. A rail 122 is associated with the frame 62 in two locations as illustrated in the two figures. A corresponding channel 124 is shown located in the container 70. The channel 124 may be an interlocking fit as shown only at the corners of the container 70 or fully through the container with additional support provided therealong. The rail mechanism is shown in association with the fairing but may be associated with the beam structure 30 as well.

Thus, improved cargo aircraft have been disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. An aircraft for carrying at least one rigid cargo container, comprising:
   a forward fuselage;
   an empennage;
   wings;
   a beam structure including a first end to which the forward fuselage is attached, a second end to which the empennage is attached, and mounts to structurally engage the at least one rigid cargo container in juxtaposition with the beam structure between the first and second ends, the wings being mounted to the beam structure,
   wherein the beam structure has sufficient rigidity to support the aircraft in flight when the beam structure is unloaded;
   wherein the beam structure has insufficient rigidity to support the aircraft in flight when the beam structure is loaded with the at least one rigid cargo container; and
   wherein the mounts detachably integrate the at least one rigid cargo container as part of the beam structure to provide additional structural rigidity to the beam structure sufficient to support the aircraft in flight;
   at least one panel fixed relative to the beam structure, wherein the at least one panel at least partially encloses the at least one rigid cargo container; and
   engines fixed relative to the beam structure.

2. The aircraft of claim 1, the mounts being on the underside of the beam structure to detachably suspend the at least one rigid cargo container therefrom.

3. The aircraft of claim 1, the mounts being on the top side of the beam structure to detachably support the at least one rigid cargo container thereon.

4. The aircraft of claim 1, the engines being mounted to the upper side of the wings.

5. The aircraft of claim 1 further comprising at least one rigid container attached to the mounts.

6. The aircraft of claim 5, the rigid container further including four columns and eight beams forming the edges and corners of a structurally unitary parallelepiped with at least two side panels, a top panel and a bottom panel.

7. An aircraft comprising:
   at least one rigid container including four columns and eight beams forming the edges and corners of a structurally unitary parallelepiped with at least two side panels, a top panel, and a bottom panel, the side panels being a composite with thin skin surfaces with a honeycomb structure therebetween and periodic longerons extending thereacross;
   a forward fuselage;
   an empennage;
   wings;
   a beam structure including a first end to which the forward fuselage is attached, a second end to which the empennage is attached, and mounts rigidly on the beam structure and structurally engaging the at least one rigid cargo container in juxtaposition with the beam structure between the first and second ends, the wings being mounted to the beam structure, the mounts detachably integrating the at least one rigid cargo container as part of the beam structure;
   aerodynamic panels to at least partially cover the at least one rigid cargo container; and
   engines fixed relative to the beam structure.

8. An aircraft comprising:
   a forward fuselage;
   an empennage;
   wings;
   a beam structure including a first end to which the forward fuselage is attached, a second end to which the empennage is attached, and mounts, wherein the beam structure has sufficient rigidity to support the aircraft in flight when the beam structure is unloaded;
   rigid cargo containers in juxtaposition with the beam structure between the first and second ends, the wings being mounted to the beam structure, wherein the beam structure has insufficient rigidity to support the aircraft in flight when the beam structure is loaded with the rigid cargo containers;
   wherein the mounts detachably integrate the rigid cargo containers as part of the beam structure to provide additional structural rigidity to the beam structure needed to support the aircraft in flight, the containers including attachments to structurally engage one another at least at each of the adjacent corners thereof, the attachments being rigidly and directly fixed to the corners;
   an aerodynamic panel that at least partially encloses the rigid cargo container; and
   engines fixed relative to the beam structure.

9. The aircraft of claim 8, the containers being the size of intermodal containers of one or more incremental lengths.

10. The aircraft of claim 8, the attachments on the ends of the containers being universally engageable with one another.

11. The aircraft of claim 10, the attachments and mounts universally engageable with one another including undercut slots and locking pins having opposed engaging surfaces engageable with the undercut slots in adjacent attachments.

12. The aircraft of claim 8, the containers each extending longitudinally on the beam structure, arranged side by side and engaging the mounts.

13. The aircraft of claim 8, the containers arranged end to end extending longitudinally on the beam structure.

14. The aircraft of claim 1, wherein
the at least one panel is a fairing attachable to the beam structure and including an interior cavity closely receiving the at least one rigid container.

15. The aircraft of claim 1, the at least one rigid container being at least four containers, two of the at least four rigid containers each extending longitudinally on top of the beam structure and arranged side by side, and two of the at least four rigid containers each extending longitudinally and depending from the beam structure and arranged side by side, the at least four rigid containers being engaged by the mounts.

16. The aircraft of claim 1, the at least one rigid container being at least four containers, a first two of the at least four rigid containers each extending longitudinally on top of and engaging the beam structure and arranged side by side, and a second two of the at least four rigid containers each extending longitudinally on top of the first two rigid containers, the at least four containers including attachments, the second two of the at least four rigid containers being arranged side by side and being attached by the attachments to the first two of the at least four rigid containers.

17. The aircraft of claim 1, the empennage including a ramp extending substantially level with the upper surface of the beam structure, horizontal stabilizers extending outwardly from the ramp and twin vertical stabilizers displaced laterally from the ramp.

18. The aircraft of claim 17, the empennage further including doors extending in an aerodynamic form rearwardly over the ramp and being mounted to selectively provide full access to the ramp.

19. The aircraft of claim 1, the forward fuselage being that of a drone.

20. The aircraft of claim 1, the forward fuselage being pivotally mounted relative to the beam to selectively provide full access to the beam.

21. The aircraft of claim 1, the forward fuselage, the empennage, the wings and the engines each being removable as a unit from association with the beam.

22. The aircraft of claim 1, wherein the at least one panel is aerodynamic.

* * * * *